United States Patent [19]

Nakano et al.

[11] Patent Number: 4,855,152

[45] Date of Patent: Aug. 8, 1989

[54] MIGRATION INHIBITOR FOR FATS AND OILS FOR BAKED CAKES AND PROCESS FOR PRODUCING COMPOSITE BAKED CAKE WITH THE USE OF THE SAME

[75] Inventors: Akira Nakano; Masaki Nomura, both of Hazakimachi, Japan

[73] Assignee: Kao Corporation, Tokyo, Japan

[21] Appl. No.: 114,677

[22] Filed: Oct. 29, 1987

[30] Foreign Application Priority Data

Nov. 17, 1986 [JP] Japan .................. 61-273521

[51] Int. Cl.$^4$ ............... A21D 13/08; A23G 3/00
[52] U.S. Cl. .................... 426/261; 426/653; 426/573; 426/659; 426/306; 426/610
[58] Field of Search ............ 426/572, 306, 659, 606, 426/607, 610, 613, 496, 653

[56] References Cited

U.S. PATENT DOCUMENTS

| | | | |
|---|---|---|---|
| 2,764,605 | 9/1956 | Embree et al. | 426/611 |
| 3,145,109 | 8/1964 | Howard | 426/610 |
| 3,914,453 | 10/1975 | Gawrilow | 426/611 |
| 4,656,045 | 4/1987 | Bodor et al. | 426/611 |
| 4,726,959 | 2/1988 | Momura et al. | 426/610 |

FOREIGN PATENT DOCUMENTS 0196780 10/1986 European Pat. Off. ........... 426/610

*Primary Examiner*—Jeanette Hunter
*Attorney, Agent, or Firm*—Flynn, Thiel, Boutell & Tanis

[57] ABSTRACT

Fats and oils can be prevented from migration by using, when cakes are baked, a fat which contains 10% by weight or more of a disaturated-monounsaturated mixed triglyceride wherein at least one fatty acid residue among the three constituent fatty acids thereof is a saturated fatty acid having 20 to 24 carbon atoms.

4 Claims, No Drawings

MIGRATION INHIBITOR FOR FATS AND OILS FOR BAKED CAKES AND PROCESS FOR PRODUCING COMPOSITE BAKED CAKE WITH THE USE OF THE SAME

Field of the Invention

This invention relates to a migration inhibitor for a food containing oleaginous ingredient(s), in particular, a baked cake, which is effective in preventing the deterioration of said cake upon storage caused by the migration of the oleaginous ingredient(s) thereof, as well as a process for producing a composite baked cake by using fat(s) and/or oil(s) containing said migration inhibitor.

Discussion of the Prior Art

It is known that baked cakes such as biscuits and cookies, among various foods containing oleaginous ingredients, would appear as if they were coated with white powder or show white spots on the surface upon storage. Similar phenomena are observed in hard batter products including chocolates, confectionary coatings containing hard butter and chocolate coatings. It is further known that extremely remarkable whitening would be observed on the surface of a chocolate in a composite product wherein a hard butter product is contacted or combined with a baked cake such as a biscuit or a cookie, for example, those prepared by dispersing the former in the latter; coating the latter with the former; or inserting the former into the latter.

This whitening on the surface of a baked cake or a composite baked cake, which is called blooming, not only deteriorates the appearance of the product but also softens the chocolate, to thereby damage the commercial value of the product.

Although the detailed mechanism of this blooming in biscuits and chocolates has not been clarified yet, it is assumed to proceed in the following manner. Oleaginous ingredients contained in a biscuit are completely molten at the baking. Then solid fats would crystallize during the subsequent cooling step. During the cooling, the surface temperature is different from the internal one and thus nuclei of crystals are formed on the cold surface. Since the cooling rate employed in the production of biscuits is very low, the crystalline solid fat ingredient within the biscuit would grow around the crystalline nuclei on the surface. A change in the temperature during storage further accelerates the growth of the crystals, which causes blooming on the surface of the biscuit. On the other hand, the separated liquid oil, which is localized within the biscuit, would migrate into an oil absorptive material, if in contact therewith, and thus be absorbed therein. Thus the melting point of the oil-absorptive material is lowered, which softens the same. Therefore the oleaginous ingredients of the biscuit are liable to suffer from melting caused by a temperature change, recrystallization and growth of crystals, which significantly lowers the resistance to blooming thereof.

Accordingly, it is believed that blooming of a baked cake such as a biscuit or a cookie or a hard butter product contacting or composed therewith might be caused by the migration of particular components of oleaginous ingredients of said baked cake followed by the growth of crystals thereof.

It is known that blooming of a hard butter product such as a chocolate per se can be inhibited to some extent by adding fats and oils other than cacao butter thereto. However there has been known no process for inhibiting the migration of particular oleaginous ingredients in a baked cake, such as a biscuit or a cookie, during the solidification step wherein the product at a high temperature is slowly cooled.

In order to maintain an excellent texture, flavor and appearance of a baked cake for a prolonged period of time, it is required to minimize the migration of particular components of oleaginous ingredients of said baked cake, which would deteriorate the quality of the cake, during the production and/or storage of the same.

SUMMARY OF THE INVENTION

We have examined the effects of various alkyl groups on the crystallizing behaviors of triglycerides in order to obtain fats and oils which would remain uniform and show no migration under such severe conditions as those employed in the production of a baked cake, such as a biscuit or a cookie, wherein a product at a high temperature, for example 60° C. or above, is slowly cooled. As a result, we have found that a fat, which contains 10% by weight or more of a triglyceride of a particular composition, i.e., a disaturated-monounsaturated mixed triglyceride wherein at least one fatty acid residue among the three constituent fatty acids thereof is a saturated fatty acid having 20 to 24 carbon atoms, exerts an effect of inhibiting the migration of fats and oils for baked cakes, thus completing the present invention.

Accordingly, the first aspect of our invention relates to a migration inhibitor for fats and oils for baked cakes, characterized by comprising a fat which contains 10% by weight or more of a disaturated-monounsaturated mixed triglyceride wherein at least one fatty acid residue among the three constituent fatty acids thereof is a saturated fatty acid having 20 to 24 carbon atoms.

The second aspect of our invention relates to a process for producing a composite baked cake which is obtained by embedding a baked cake comprising wheat flour, fats, oils, sugar and water as main ingredients in chocolate or cream, coating said baked cake with chocolate or cream, or inserting or dispersing chocolate or cream in said baked food, characterized by using fat(s) and/or oil(s) which contain 0.5 to 100% by weight of a migration inhibitor for fats and oils for baked cakes comprising a fat which contains 10% by weight or more of a disaturated-monounsaturated mixed triglyceride wherein at least one fatty acid residue among the three constituent fatty acids thereof is a saturated fatty acid having 20 to 24 carbon atoms as the oleaginous ingredients of said baked cake.

The fat containing 10% by weight or more of a disaturated-monounsaturated mixed triglyceride wherein at least one fatty acid residue among the three constituent fatty acids thereof is a saturated fatty acid having 20 to 24 carbon atoms, which will be simply called the fat for the present invention hereinafter, shows specific crystallizing behaviors. That is, when the fat for the present invention per se is dissolved in a liquid oil and then slowly cooled, it does not form macrocrystals similar to those which a disaturated-monounsaturated mixed triglyceride comprising stearic or palmitic acid forms, but is uniformly dispersed in the oil in the form of microcrystals to thereby form a dense network. Thus the dispersion becomes a gel-like solid and the migration of the liquid oil is inhibited thereby. In addition, the fat for the present invention exhibits a surprising effect of suppressing the crystallization of other solid fats. Thus triglycerides comprising stearic and palmitic acids, which have no effect of inhibiting migration per se, would exert a migration-inhibiting effect in the presence of the fat for the present invention. Therefore the fat for the present invention can exert the effect of inhibiting the migration of other fats and oils in an extremely small amount, i.e., 0.5% by weight or above, preferably 1% by weight or above.

The fat for the present invention is characterized in that the presence of a long-chain saturated fatty acid residue having 20 to 24 carbon atoms might bring about the effect of inhibiting the migration of fats and oils. This effect might be further enhanced when the disaturated-monounsaturated mixed triglyceride has two saturated fatty acid residues each having 20 to 24 carbon atoms. However the above effect depends neither on the type of the unsaturated fatty acid constituting the unsaturated fatty acid residue nor on the binding position of the same.

The fat for the present invention can be obtained by various methods which are not particularly restricted. For example, the following methods may be employed therefor.

An extremely hardened oil obtained from fat(s) and/or oil(s) containing a large amount of unsaturated fatty acids having 20 to 24 carbon atoms, e.g., cruciferous oils such as high-erucic rapeseed oil or fish oil, behenic triglyceride and/or a composition thereof with other fat(s) and/or oil(s) are subjected to transesterification with fat(s) and/or oil(s) containing a large amount of unsaturated acids such as soybean, rapeseed, olive, safflower and cottonseed oils with the use of an alkali catalyst such as sodium methylate to give the fat for the present invention. Alternately, the fat for the present invention may be obtained by transesterifying a composition which comprises fat(s) and/or oil(s) containing a large amount of saturated fatty acid(s) having 20 to 24 carbon atoms and unsaturated fatty acid(s) or fat(s) and/or oil(s) containing a large amount of unsaturated fatty acid(s) and saturated fatty acid(s) having 20 to 24 carbon atoms with the use of lipase. The transesterified oil thus obtained may be refined and used as such as a migration inhibitor for fats and oils for baked cakes. Alternately, an enhanced effect can be achieved by fractionating the trisaturated triglyceride(s) and triunsaturated triglyceride(s) thus formed and concentrating the disaturated-monounsaturated mixed triglyceride(s) having 20 to 24 carbon atoms, if required. The fat for the present invention thus obtained can be used as such as a migration inhibitor for fats and oils for baked cakes. Further they can be introduced into other fat(s) and/or oil(s) in such a ratio as to give a content of the fat for the present invention of 0.5% by weight or more, preferably 0.5 to 100% by weight.

As described above, the present invention relates to the application of the specific properties and behaviors of a disaturated-monounsaturated mixed triglyceride, wherein at least one fatty acid residue among the three constituent fatty acids thereof is a long-chain saturated fatty acid residue having 20 to 24 carbon atoms, as a migration inhibitor for fats and oils for baked cakes.

Different from common solid fats comprising stearic and palmitic acids as main components, the fat for the present invention is in the form of a transparent waxy solid which has an excellent spreadability and properties similar to those of acetin fat. When dissolved in a liquid oil and then slowly cooled, it does not show any growth of crystals caused by concentrated solid fat components but is uniformly precipitated in the system in the form of microcrystals. Simultaneously, they form a network of the microcrystals which inhibits the separation of liquid oil components. These effects extend not only on the fat for the present invention per se but also over other solid fats and thus alter the crystallizing behaviors thereof. Thus common fats and oils also exert a migration-inhibiting effect in the presence of the fat for the present invention.

In the case of composite baked cakes obtained by coating a baked cake such as a biscuit or a cookie with chocolate or cream, inserting or dispersing the latter in the former, or embedding the former in the latter, spotted discoloration on the surface and inside of the baked cake portion or whitening of the whole product is frequently observed during the storage or transportation of the cakes. These phenomena seriously deteriorate the appearance of the product and make the same moldy to thereby damage the commercial value thereof. The migration inhibitor for fats and oils for baked cakes of the present invention is very effective in inhibiting the spotted discoloration and whitening of the composite baked cakes as described above. This effect is believed to be caused by the fact that the migration inhibitor of the present invention can inhibit the migration of fats and oils contained in the baked cake and chocolate or cream.

EXAMPLES

To further illustrate the present invention, the following Synthesis Examples and Examples will be given wherein all % and parts are by weight.

Synthesis Example 1

High-erucic rapeseed oil was hydrogenated to give an extremely hardened oil having an iodine value of 2 or below (fatty acid composition: 4.2% of palmitic acid, 42.2% of stearic acid, 5.6% of arachic acid and 47.3% of behenic acid). To 30 parts of this higherucic rapeseed oil, 70 parts of rapeseed oil (fatty acid composition: 3.0% of palmitic acid, 1.7% of stearic acid, 57.1% of oleic acid, 21.9% of linolic acid, 12.7% of linolenic acid and 1.7% of erucic acid) was added and the resulting mixture was subjected to transesterification at 80° C. for 30 minutes with the use of 0.1%, based on the oils, of sodium methylate as a catalyst. The transesterified oil thus obtained was washed with water, decolorized and deodorized in a conventional manner to give the product (1) of the present invention.

Synthesis Example 2

To 50 parts of behenic triglyceride (fatty acid composition: 2.4% of stearic acid, 9.9% of arachic acid and 84.9% of behenic acid), 50 parts of olive oil (fatty acid composition: 10.9% of palmitic acid, 3.7% of stearic acid, 80.5% of oleic acid and 5.0% of linolic acid) was added and the resulting mixture was subjected to transesterification at 80° C. for 30 minutes with the use of 0.1%, based on the oils, of sodium methylate as a catalyst. The transesterified oil thus obtained was washed with water, decolorized and deodorized in a conventional manner to give the product (2) of the present invention.

Synthesis Example 3

4 ml/g of acetone was added to the transesterified oil obtained in Synthesis Example 2 and dissolved therein.

Then the solution was cooled from 50° C. to 30° C. under stirring and a high-melting fraction thus precipitated, which comprised trisaturated triglycerides as the main component, was filtered out (yield: 15% based on the transesterified oil). The filtrate was further cooled to 10° C. under stirring and the aimed fraction thus precipitated was collected. After distilling off the solvent from this fraction, the residue was deodorized in a conventional manner to give the product (3) of the present invention.

Table 1 shows the iodine values, melting points and fatty acid compositions, which were determined by gas chromatography, of the products (1) to (3) of the present invention as obtained in the above Synthesis Examples 1 to 3. Table 2 shows the triglyceride compositions thereof, which were determined by silver nitrate-containing silica gel thin layer chromatography and gas chromatography.

Evaluation of migration-inhibiting effect

The products (1) to (3) of the present invention and the extremely hardened high-erucic rapeseed oil for comparison were added to the shortening and dissolved therein. Each solution thus obtained was slowly cooled from 50° C. to 30° C. at a rate of 0.1° C./min and then stored at 30° C. for 48 hours. After the storage, the lower part, i.e., 10 mm from the bottom of a sheet of filter paper (30 mm×45 mm) was inserted into the sample and kept as such for additional one hour at 30° C. Then the filter paper was taken out and the solid fat adhering thereto were wiped off. Subsequently the amount of the fats and oils, which had migrated to the filter paper and absorbed therein, was determined.

Results of Evaluation

The results are shown in Table 3. Table 3 obviously

TABLE 1

| | Yield*[1] | Iodine value | Melting point | Fatty acid composition (%)*[2] | | | | | | | | |
|---|---|---|---|---|---|---|---|---|---|---|---|---|
| | | | | $C_{16}$ | $C_{18}$ | $C_{18}F_1$ | $C_{18}F_2$ | $C_{18}F_3$ | $C_{20}$ | $C_{22}$ | $C_{22}F_1$ | $C_{24}$ |
| Product (1) of invention | 100% | 82.2 | 42.6° C. | 3.7 | 13.9 | 40.2 | 15.3 | 8.9 | 1.7 | 14.9 | 1.2 | — |
| Product (2) of invention | 100% | 41.9 | 58.0° C. | 5.5 | 3.0 | 40.2 | 2.5 | — | 5.0 | 42.5 | — | 1.0 |
| Product (3) of invention | 43.7% | 32.5 | 43.2° C. | 4.5 | 2.4 | 28.2 | 3.8 | 0.3 | 4.7 | 53.4 | — | 2.0 |

*[1]Yield based on the transesterified oil.
*[2]$C_{18}F_1$ means an unsaturated fatty acid having 18 carbon atoms and one double bond. Namely, $C_mF_n$ means an unsaturated fatty acid having m carbon atoms and n double bonds.

TABLE 2

| | Trisaturated triglyceride | Disaturated-monounsaturated triglyceride | | Monosaturated-diunsaturated triglyceride | Triunsaturated triglyceride |
|---|---|---|---|---|---|
| | | A*[3] | B*[4] | | |
| Product (1) of invention | 3.8% | 16.4% | 6.0% | 44.9% | 29.4% |
| Product (2) of invention | 14.6 | 30.2 | 9.4 | 35.7 | 10.7 |
| Product (3) of invention | 15.0 | 66.0 | 3.6 | 13.3 | 1.3 |

*[3]Content of disaturated-monounsaturated triglycerides having at least one saturated fatty acid residue having 20 to 24 carbon atoms (%).
*[4]Content of disaturated-monounsaturated triglycerides having two saturated fatty acid residues having 18 or less carbon atoms (%).

EXAMPLE 1

The products (1) to (3) of the present invention as obtained in Synthesis Examples 1 to 3 were added to shortening for baked cakes, which had a melting point of 36° C. and an iodine value of 54.3 and was free from any saturated fatty acids having 20 or more carbon atoms (fatty acid composition: 1.1% of lauric acid, 1.4% of myristic acid, 26.1% of palmitic acid, 5.8% of stearic acid, 63.7% of oleic acid including elaidic acid and 0.9% of eicosenoic acid), and the migration-inhibiting effect of each product was evaluated. In addition, the effect of extremely hardened high-erucic rapeseed oil was similarly evaluated for comparison.

indicates that the amounts of the control 1-1 containing no product of the present invention and the oleaginous composition containing the comparative product absorbed in the filter paper were comparable to that of the liquid oil (100% rapeseed oil) in spite of the presence of crystals, since the precipitated crystals grew into macrocrystals and caused solid/liquid separation in the former cases. On the other hand, the fat compositions containing the products (1) to (3) of the present invention were hardly absorbed in the filter paper, which suggests that the migration of the fats and oils was sufficiently inhibited in these cases. It has been further clarified that the migration-inhibiting effect could be enhanced with an increase in the content of the product of the present invention.

TABLE 3

| Sample | | Rapeseed oil (%) | Shortening (%) | Extremely hardened high-erucic rapeseed oil (%) | Content of product of invention (%) | Disaturated-*[5] monounsaturated triglyceride for invention (%) | Solid fat content at 30° C. (SFC) | Fat or oil migrating at 30° C. (mg) |
|---|---|---|---|---|---|---|---|---|
| Liquid oil | | 100 | 0 | 0 | 0 | 0 | 0 | 120 |
| Control 1-1 | | 0 | 100 | 0 | 0 | 0 | 23.9 | 114 |
| Fat composition containing product (1) of invention | 1-11 | 0 | 90 | 0 | 10 | 1.6 | 21.3 | 70 |
| | 1-12 | 0 | 80 | 0 | 20 | 3.3 | 19.0 | 50 |
| | 1-13 | 0 | 70 | 0 | 30 | 4.9 | 18.4 | 41 |
| Fat | 1-21 | 0 | 97 | 0 | 3 | 1.2 | 23.0 | 75 |

TABLE 3-continued

| Sample | | Rapeseed oil (%) | Shortening (%) | Extremely hardened high-erucic rapeseed oil (%) | Content of product of invention (%) | Disaturated-[*5] monounsaturated triglyceride for invention (%) | Solid fat content at 30° C. (SFC) | Fat or oil migrating at 30° C. (mg) |
|---|---|---|---|---|---|---|---|---|
| composition | 1-22 | 0 | 90 | 0 | 10 | 4.0 | 21.5 | 48 |
| containing | 1-23 | 0 | 85 | 0 | 15 | 6.0 | 20.8 | 40 |
| product (2) of invention | | | | | | | | |
| Fat | 1-31 | 0 | 98 | 0 | 2 | 1.3 | 24.2 | 72 |
| composition | 1-32 | 0 | 95 | 0 | 5 | 3.3 | 24.4 | 51 |
| containing | 1-33 | 0 | 90 | 0 | 10 | 6.6 | 24.8 | 35 |
| product (3) of invention | | | | | | | | |
| Fat | 1-41 | 0 | 95 | 3 | 0 | 0 | 25.4 | 115 |
| composition | 1-42 | 0 | 90 | 5 | 0 | 0 | 26.5 | 113 |
| containing | 1-43 | 0 | 85 | 10 | 0 | 0 | 28.3 | 114 |
| comparative product | | | | | | | | |

[*5]Content of disaturated-monounsaturated mixed triglycerides having at least one saturated fatty acid residue having 20 to 24 carbon atoms (%).

EXAMPLE 2

Biscuits were produced with the use of shortening containing the products (1) to (3) of the invention as evaluated in Example 1 and extremely hardened high-erucic rapeseed oil (for comparison) and the surface of each biscuit was observed.

Composition of biscuit (sugar batter method):

| | |
|---|---|
| wheat flour | 48% |
| shortening | 20% |
| sugar | 20% |
| water | 12%. |

Storage of biscuit and observation of the surface thereof:

The biscuits baked in a conventional manner were taken out of an oven and allowed to cool at room temperature for one hour. Then they were sealed in a bag and stored at room temperature. After allowing the biscuits to stand at 5° C. for one hour, the surface of each biscuit was observed with the naked eye.

Results of evaluation

The results are shown in Table 4. Table 4 obviously indicates that biscuits containing the control 2-1, which had no saturated fatty acid residue having 20 or more carbon atoms, and those containing the comparison product, which contained a saturated fatty acid residue having 20 or more carbon atoms but was not in the form of a mixed triglyceride, showed whitening on the surface within two weeks. In contrast thereto, the surface of the biscuits containing the products of the present invention having a migration-inhibiting effect were maintained in an excellent condition for a prolonged period of time. It has been further clarified that the surface condition could be improved with an increase in the content of the product of the invention.

TABLE 4

| | | | Observation of the surface of biscuits | | | | | |
|---|---|---|---|---|---|---|---|---|
| | | Content of product[*6] of invention or comparative product (%) | Immediately after the initiation of storage | Storage period | | | | |
| Sample | | | | 2 weeks | 1 month | 2 months | 4 months | 6 months |
| Control 2-1 | | 0 | (−) | (+) | (++) | (++) | (+++) | (+++) |
| Biscuit | 2-11 | 10 | (−) | (−) | (±) | (±) | (+) | (+) |
| containing | 2-12 | 20 | (−) | (−) | (−) | (±) | (±) | (±) |
| product (1) of invention | 2-13 | 30 | (−) | (−) | (−) | (−) | (±) | (±) |
| Biscuit | 2-21 | 3 | (−) | (−) | (±) | (±) | (+) | (+) |
| containing | 2-22 | 10 | (−) | (−) | (−) | (±) | (±) | (±) |
| product (2) of invention | 2-23 | 15 | (−) | (−) | (−) | (−) | (±) | (±) |
| Biscuit | 2-31 | 2 | (−) | (−) | (±) | (±) | (±) | (+) |
| containing | 2-32 | 5 | (−) | (−) | (−) | (±) | (±) | (±) |
| product (3) of invention | 2-33 | 10 | (−) | (−) | (−) | (−) | (±) | (±) |
| Biscuit | 2-41 | 3 | (−) | (+) | (++) | (++) | (+++) | (+++) |
| containing | 2-42 | 5 | (−) | (+) | (++) | (++) | (+++) | (+++) |
| comparative product | 2-43 | 10 | (−) | (+) | (++) | (++) | (+++) | (+++) |

[*6]Content based on oleaginous ingredients of biscuit (%).
Criterion: (−): good, (±): almost good, (+): slight whitening; (++): partial whitening; and (+++): whole whitening.

EXAMPLE 3

Composite baked cakes were produced by coating the biscuits baked in Example 2 with a chocolate and then stored in the same manner as the one described in Example 2. The surface of the chocolate coating of each composite baked cake was observed with the naked eye after storing the same for given periods, i.e., one week, two weeks, one month, two months and four months.

Composition of chocolate:

| | |
|---|---|
| bitter chocolate | 35% |
| powdery sugar | 51% |
| cacao fat | 13.6% |
| lecithin | 0.3% |
| perfume | 0.1%. |

Results of observation

The results are shown in Table 5. Table 5 indicates that the chocolate per se showed blooming, i.e., slightly whitening after storing the same for two months. This blooming was accelerated in the cases of the biscuits comprising shortening free from any disaturated-monounsaturated mixed triglycerides having saturated fatty acid residue(s) having 20 to 24 carbon atoms, i.e., the control 3-1 and the comparison product. In contrast thereto, this phenomenon was considerably inhibited in the biscuits containing the products (1) to (3) of the present invention.

taining the product (3) of the present invention as prepared in Synthesis Example 3 in an amount of 5% based on the oleaginous ingredients. The obtained composite baked cakes were stored in the same manner as the one described in Example 3 and the surface of the chocolate coating of each product was observed. Composition of chocolate:

| | Amount (%) | Oleaginous material (%) |
|---|---|---|
| bitter chocolate | 35 | 18.2 |
| | (oil: 52%) | |
| powdery sugar | 51 | — |
| cacao fat | 12 | 12.0 |
| product (3) of invention | 1.6 | 1.6 |
| | | (5.03% in total oleaginous ingredients) |
| lecithin | 0.3 | |
| perfume | 0.1 | |

The results are shown in Table 6. The incorporation of the product (3) of the present invention was effective in inhibiting the blooming (whitening) of the chocolate per se. Therefore chocolate-coated biscuits maintaining excellent properties upon prolonged storage can be

TABLE 5

| Sample | | Content of product*7 of invention or comparative product (%) | Immediately after the initiation of storage | Storage period | | | | |
|---|---|---|---|---|---|---|---|---|
| | | | | 1 week | 2 weeks | 1 month | 2 months | 4 months |
| Chocolate alone | | — | (−) | (−) | (±) | (±) | (+) | (++) |
| Control 3-1 | | 0 | (−) | (+) | (++) | (+++) | (+++) | (+++) |
| Biscuit | 3-11 | 10 | (−) | (−) | (±) | (±) | (+) | (++) |
| containing | 3-12 | 20 | (−) | (−) | (±) | (±) | (+) | (++) |
| product (1) | 3-13 | 30 | (−) | (−) | (±) | (±) | (+) | (++) |
| of invention | | | | | | | | |
| Biscuit | 3-21 | 3 | (−) | (−) | (±) | (+) | (+) | (++) |
| containing | 3-22 | 10 | (−) | (−) | (±) | (±) | (+) | (++) |
| product (2) | 3-23 | 15 | (−) | (−) | (±) | (±) | (+) | (++) |
| of invention | | | | | | | | |
| Biscuit | 3-31 | 2 | (−) | (−) | (±) | (+) | (+) | (++) |
| containing | 3-32 | 5 | (−) | (−) | (±) | (±) | (+) | (++) |
| product (3) | 3-33 | 10 | (−) | (−) | (±) | (±) | (+) | (++) |
| of invention | | | | | | | | |
| Biscuit | 3-41 | 3 | (−) | (+) | (++) | (+++) | (+++) | (+++) |
| containing | 3-42 | 5 | (−) | (+) | (++) | (+++) | (+++) | (+++) |
| comparative | 3-43 | 10 | (−) | (+) | (++) | (+++) | (+++) | (+++) |
| product | | | | | | | | |

*7Content based on oleaginous ingredients of biscuit (%).
Criterion: (−): good, (±): almost good; (+): slight whitening; (++): partial whitening; and (+++): whole whitening.

EXAMPLE 4

Composite baked cakes were produced by coating the biscuits baked in Example 2 with a chocolate conobtained by adding the fat for the present invention to the biscuits and the chocolate.

TABLE 6

| Sample | | Content of product*8 of invention or comparative product (%) | Immediately after the initiation of storage | Storage period | | | | |
|---|---|---|---|---|---|---|---|---|
| | | | | 1 week | 2 weeks | 1 month | 2 months | 4 months |
| Chocolate alone | | — | (−) | (−) | (−) | (−) | (±) | (±) |
| Control 4-1 | | 0 | (−) | (−) | (±) | (±) | (+) | (++) |
| Biscuit | 4-11 | 10 | (−) | (−) | (−) | (±) | (±) | (+) |
| containing | 4-12 | 20 | (−) | (−) | (−) | (−) | (±) | (±) |
| product (1) | 4-13 | 30 | (−) | (−) | (−) | (−) | (±) | (±) |
| of invention | | | | | | | | |
| Biscuit | 4-21 | 3 | (−) | (−) | (−) | (±) | (±) | (+) |
| containing | 4-22 | 10 | (−) | (−) | (−) | (±) | (±) | (±) |
| product (2) | 4-23 | 15 | (−) | (−) | (−) | (−) | (±) | (±) |
| of invention | | | | | | | | |
| Biscuit | 4-31 | 2 | (−) | (−) | (−) | (±) | (±) | (+) |
| containing | 4-32 | 5 | (−) | (−) | (−) | (−) | (±) | (±) |
| product (3) | 4-33 | 10 | (−) | (−) | (−) | (−) | (±) | (±) |
| of invention | | | | | | | | |
| Biscuit | 4-41 | 3 | (−) | (−) | (±) | (±) | (+) | (++) |
| containing | 4-42 | 5 | (−) | (−) | (±) | (±) | (+) | (++) |

TABLE 6-continued

| Sample | Content of product*8 of invention or comparative product (%) | Immediately after the initiation of storage | Storage period | | | | |
|---|---|---|---|---|---|---|---|
| | | | 1 week | 2 weeks | 1 month | 2 months | 4 months |
| comparative product | 4-43  10 | (−) | (−) | (±) | (±) | (+) | (++) |

*8Content based on oleaginous ingredients of biscuit (%).
Criterion: (−): good; (±): almost good; (+): slight whitening; (++): partial whitening; and (+++): whole whitening.

Effects of the Invention

The migration inhibitor for fats and oils for baked cakes of the present invention shows specific crystallizing behaviors which are never observed in commonly known fats and oils. That is, when slowly cooled in a liquid oil, it does not show any growth of crystals but uniformly solidifies to thereby inhibit the migration of the liquid oil. Further the product of the present invention affects the crystallizing behaviors of other solid fats and imparts a migration-inhibiting effect thereto. Thus the product of the present invention can exert the migration-inhibiting effect in an amount as small as 0.5%, preferably 1% or more. These effects of the product of the present invention makes it available not only in inhibiting the whitening of the surface of a baked cake such as a biscuit or a cookie, but also in suppressing the influence of said baked cake on oleaginous products contacting therewith, e.g., chocolate chips dispersed therein or chocolate or cream coating thereof or inserted therein. Furthermore, the product of the present invention inhibits the blooming of a chocolate product per se. Therefore baked cakes such as biscuits and cookies, chocolate products and composite baked cakes containing the product of the present invention can maintain excellent properties upon prolonged storage.

What is claimed is:

1. In a process for preparing a baked farinaceous food product which comprises mixing flour, an edible oleaginous component, and other comestible ingredients to form a bakable mixture and then baking said mixture to produce said baked farinaceous food product, the improvement which comprises: said oleaginous component comprises from 0.5 to 100 wt.% of an edible fat migration inhibitor composition and the balance of said oleaginous component is edible oil or fat suitable for making baked farinaceous food products, said edible fat migration inhibitor composition being an edible fat containing 10 wt.% or more, based on said migration inhibitor composition, of a disaturated-monounsaturated mixed acid triglyceride, at least one of the saturated fatty acid moieties of said mixed acid triglyceride being a saturated fatty acid having from 20 to 24 carbon atoms, wherein to inhibit migration of portions of said oleaginous component to the surface of said baked farinaceous food product during cooling thereof from the baking temperature.

2. A process as claimed in claim 1 which includes the additional step of coating said baked farinaceous food product with chocolate or cream.

3. A process as claimed in claim 1 which includes the additional step of inserting chocolate or cream in said baked food product.

4. A process as claimed in claim 1 which includes the additional step of embedding said baked food product in chocolate or cream.

* * * * *